United States Patent [19]
Walker

[11] Patent Number: 5,327,791
[45] Date of Patent: Jul. 12, 1994

[54] VEHICLE BEAM LOAD MEASURING SYSTEM

[76] Inventor: Robert R. Walker, 10115 Orangewood Ave., Garden Grove, Calif. 92640

[21] Appl. No.: 821,710

[22] Filed: Jan. 16, 1992

[51] Int. Cl.⁵ .......................................... G01G 19/00
[52] U.S. Cl. ................................ 73/862.628; 177/211
[58] Field of Search .................. 73/862.045, 862.632, 73/767, 862.628; 177/211, 137

[56] References Cited

U.S. PATENT DOCUMENTS

| | | | |
|---|---|---|---|
| 3,283,838 | 11/1966 | Fetterman et al. | 177/211 |
| 3,854,540 | 12/1974 | Holmstrom | 177/136 |
| 3,879,998 | 4/1975 | Bradley | 177/211 |
| 3,949,822 | 4/1976 | English et al. | 177/126 |
| 4,020,911 | 5/1977 | English et al. | 177/136 |
| 4,042,049 | 8/1977 | Reichow et al. | 177/137 |
| 4,102,031 | 7/1978 | Reichow et al. | 29/464 |
| 4,212,197 | 7/1980 | Kawai et al. | 73/862.634 |
| 4,215,754 | 8/1980 | Hagedorn et al. | 177/137 |
| 4,281,728 | 8/1981 | Dickason et al. | 177/134 |
| 4,364,279 | 12/1982 | Stern et al. | 73/862.622 |
| 4,441,569 | 4/1984 | Sashiki et al. | 73/862.634 |
| 4,666,003 | 5/1987 | Reichow | 73/862.632 |
| 4,667,520 | 5/1987 | Fraser et al. | 73/862.042 |
| 5,052,505 | 10/1991 | Naito et al. | 73/862.634 |

Primary Examiner—Richard E. Chilcot, Jr.
Assistant Examiner—R. Biegel
Attorney, Agent, or Firm—Baker, Maxham, Jester & Meador

[57] ABSTRACT

A system for sensing the load on a load supporting beam of a vehicle. The system comprises an elongate sensor beam and means for releasably securing a pair of opposite end sections of the sensor beam to a load supporting beam of a vehicle. The sensor beam is secured to the load supporting beam so that a longitudinal axis of the load sensor beam is aligned with a longitudinal axis of the load supporting beam. A plurality of strain gauges are attached to a central section of the load sensor beam. The strain gauges are connected so that each of them can transmit an output signal processor.

5 Claims, 2 Drawing Sheets

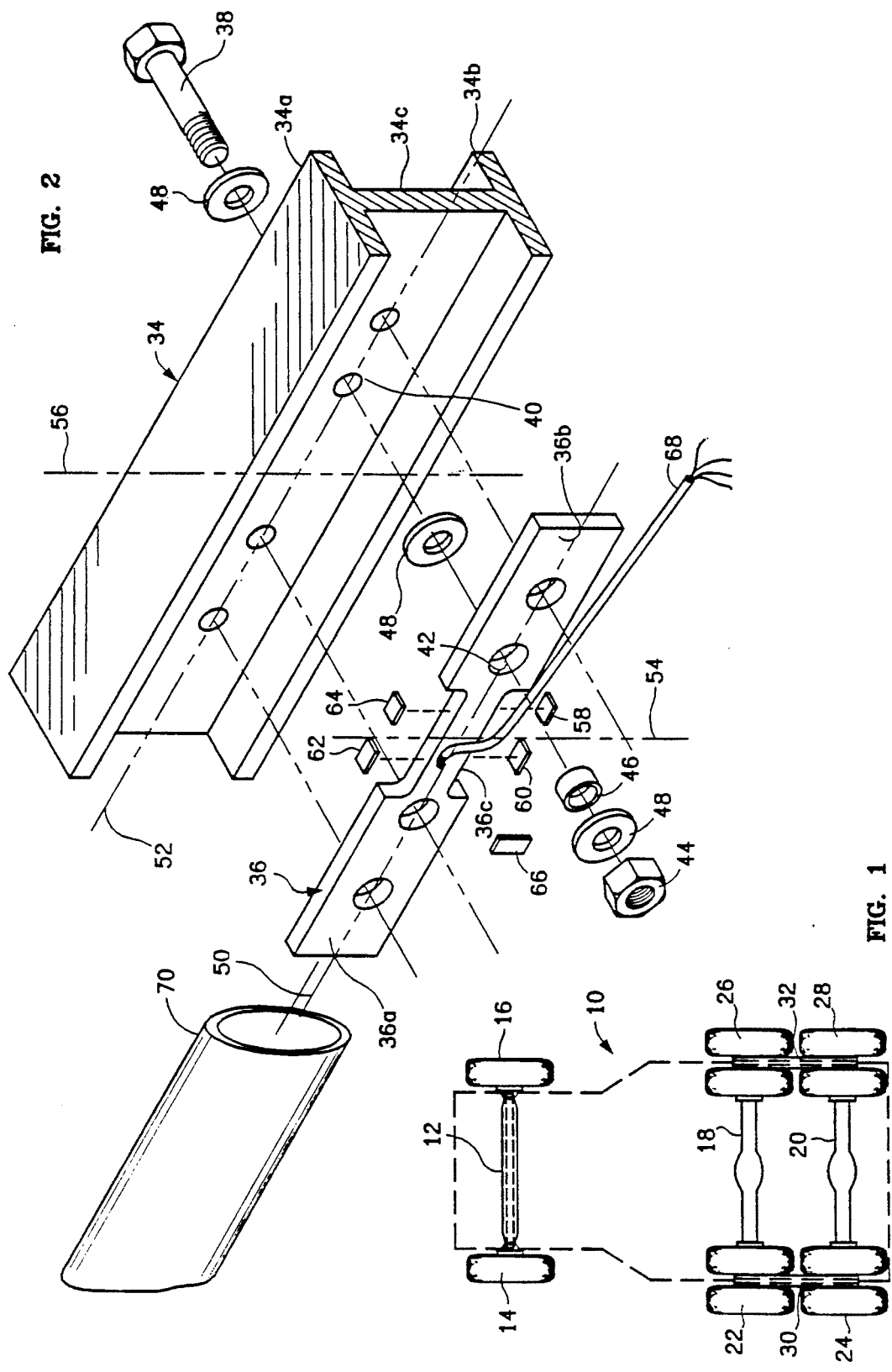

$f$ = STRESS
$m$ = BENDING MOMENT
$J$ = MOMENT OF INERTIA
$y$ = DISTANCE FROM NEUTRAL AXIS ical to bolt the sensors to metal mounting pads which are welded to the beam cap. The heat transfer coefficient of the pads has been significantly different than that of the load beam which has contributed to inaccuracy in the measured weight. Also, prior on-board vehicle load measuring systems have generally required field calibration utilizing known weight changes.

SUMMARY OF THE INVENTION

It is therefore the primary object of the present invention to provide an improved vehicle beam load measuring system.

The present invention provides a system for sensing the load on a load supporting beam of a vehicle. The system comprises an elongate sensor beam and means for releasably securing a pair of opposite end sections of the sensor beam to a load supporting beam of a vehicle. The sensor beam is secured to the load supporting beam so that a longitudinal axis of the load sensor beam is aligned with a longitudinal axis of the load supporting beam. A plurality of strain gauges are attached to a central section of the load sensor beam. The strain gauges are connected so that each of them can transmit an output signal processor.

BRIEF DESCRIPTION OF THE DRAWINGS

FIG. 1 is a diagrammatic plan view illustrating the front axle beam and rear equalizer beams of a tandem-wheeled tractor truck which may be equipped with a preferred embodiment of the load measuring system of the present invention.

FIG. 2 is an enlarged, exploded fragmentary perspective view illustrating mechanical details of the preferred embodiment of the present invention in connection with a load supporting beam of a truck.

DESCRIPTION OF THE PREFERRED EMBODIMENT

Figure 4:
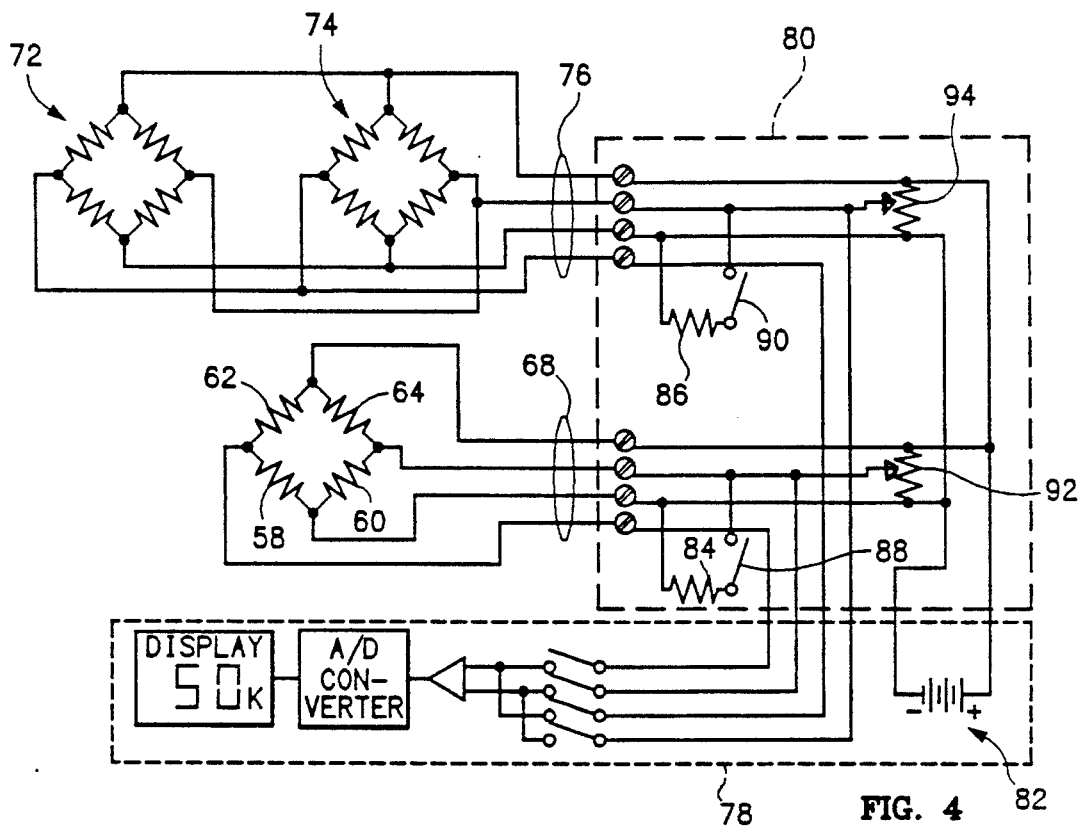
FIG. 4 is a schematic diagram illustrating circuit details of the preferred embodiment of the present invention.

The on-board vehicle beam load measuring system of the present invention may be installed on a vehicle, such as a tandem-wheeled tractor truck 10. The truck has a front axle beam 12 which supports a pair of front wheels 14 and 16. The truck further has a tandem-axle rear suspension system including fore and aft axle assemblies 18 and 20 having sets 22, 24, 26 and 28 of dual wheels mounted on opposite ends thereof. The ends of the fore and aft axle assemblies are connected by equalizer beams 30 and 32. The longitudinal center of each of these beams is pivotally connected to the frame of the truck 10 through a mechanism not illustrated. See for example, U.S. Pat. Nos. 2,914,349; 3,129,016; and 4,042,049. The front axle beam 12 and the equalizer beams 30 and 32 are typically I-beams. They bend or deflect in an amount proportional to the load on the truck. My on-board load measuring system utilizes strain gauges on these I-beams to sense the amount of load on the truck.

According to the preferred embodiment of my invention, a Wheatstone bridge arrangement of four strain gauges is utilized to sense the load on the front axle beam 12 and on the equalizer beams 30 and 32. The term "load supporting beam" refers to either the front axle beam 12 or to one of the equalizer beams 30 and 32.

FIG. 2 illustrates the intermediate section of a load supporting beam 34 of the tractor truck 10. The load supporting beam has an I-beam configuration including a horizontal upper compression cap 34a and a horizontal lower tension cap 34b connected by a vertical central web 34c. In accordance with the preferred embodiment of my invention, an elongate sensor beam 36 is secured to the central web 34c of the longitudinally intermediate section of the load supporting beam 34 so that the longitudinal axis of the load sensing beam is aligned with the longitudinal axis of the load supporting beam.

The sensor beam 36 (FIG. 2) has a planar rectangular shape including a pair of opposite end sections 36a and 36b and a central section 36c. By way of example, the sensor beam 36 may measure approximately twelve inches in length, by one and one-half inches in height by one-quarter inch in thickness. The distance between the centers of the holes 42 on either end of the central section 36c may be approximately five inches. The sensor beam 36 is releasably secured to the load supporting beam 34 with a plurality of bolts such as 38 which extend through corresponding holes 40 in the central section of the web 34c and through corresponding holes 42 in the sensor beam The bolts are held in place by nuts such as 44. As illustrated in FIG. 2, four holes 40 are drilled in central web 34c of the I-beam 34. The diameter of the holes 40 is very close to the outer diameter of an unthreaded portion of the bolts 38. Four holes 42 are also drilled in the sensor beam 36. Each of these holes receive hardened bushings such as 46. The diameter of the holes 42 is very close to the outside diameter of the bushings 46 and the inside diameter of the bushings 46 is very close to the outside diameter of the unthreaded portion of the bolts 38. As best seen in FIG. 4, a plurality of washers 48 are used to separate the head of the bolt 38, the central web 34c of the load supporting beam, the bushing 46 the central section 36c of the sensor beam and the nut 44.

Referring again to FIG. 2, the sensor beam and the load supporting beam are preferably secured together so that their neutral axes 50 and 52, respectively, are in alignment with each other. In addition, the sensor beam and the load supporting beam are preferably secured together so that their center lines 54 and 56, respectively, are in alignment with each other.

Referring still to FIG. 2, the sensor beam 36 is preferably made of the same metal as the load supporting beam 34. For example, if the load supporting beam 34 is made of a certain grade of steel then the sensor beam 36 should be made of the same grade of steel. Similarly, if the load supporting beam is some other type of metal, such as Aluminum, then the sensor beam 36 should be made out of the same type of metal. It can be understood that when the load supporting beam 34 bends or deflects about its center line 56 due to changes in the loading of the truck 10, the sensor beam 36 which is rigidly secured thereto, will similarly bend or deflect about its center line 54 in the same amount. By making the sensor beam 36 and the load supporting beam 34 out of compatible materials, the sensor beam will not be subjected to bending or flexure as a result of differences in the thermal expansion coefficients of the respective materials of these members. In this manner, all of the bending or flexing of the sensor beam 36 will be attributable to variations in the load of the truck.

Figure 3:
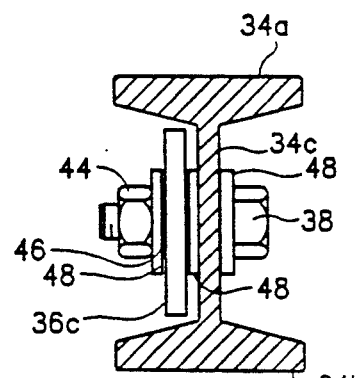
FIG. 3 is a cross-sectional view illustrating details of the manner in which the load sensor beam of the preferred embodiment is attached to the load supporting beam of the truck.

The sensor beam 36 (FIG. 2) is preferably fabricated from rectangular planar bar stock such that the cross-sectional area of its central section 36c is smaller than that of its opposite end section 36a and 36b. This can be done by cutting away portions from the upper and lower edges of the bar stock so that the width of the central section 36c is less than the width of the opposite end sections 36a and in 36b. This reduction the cross-sectional area of the central section 36c of the sensor beam reduces the shear and bending loads on the attachments bolts 38. The central section 36c is preferably about one-third of the overall length of the sensor beam 36. The hardened bushings 46 which are located in each of the attachment holes 42 in the sensor beam help reduce wear on the bolts 38 and the sensor beam itself. Preferably, the diameter of the holes 42 relative to the outside diameter of the hardened bushings 46 is such that the bushings must be press fit into the holes 42. In addition, preferably the thickness of the bushings relative to their central axes is such that the bushings will be flush with the outboard and inboard faces of the sensor beam 36 when pressed in place. This is not shown in FIG. 3.

The attachment of the sensor beam over the neutral axis 52 of the central web of the load supporting beam 34 permits the two beams to bend in unison, thereby eliminating premature failure of the beam 34 due to stress concentration- By using templates and precision drilling, the location and size of the holes 40 and 42 can be carefully controlled. Close tolerances relative to the diameters of the bolts 38 and the bushings 46 can be maintained, thereby ensuring accurate and repeatable readings of the loading on the beam 34 regardless of temperature changes.

Referring still to FIG. 2, a pair of strain gauges 58 and 60 are attached to the lower edge of the central section 36c of the sensor beam. Another pair of strain gauges 62 and 64 are attached to the upper edge of the central section 36c of the sensor beam. The four strain gauges are wired in a Wheatstone bridge configuration via a terminal strip 66 which is bonded to the outboard face of the central section 36c of the sensor beam. Each gage produces twenty-five percent of the output signal when the sensor beam is subject to bending or flexure. Where the sensor beam 36 is made of Aluminum, it is preferred to use type CEA 13 strain gauges. Where the sensor beam is made of steel, it is preferred to use CEA 06 strain gauges. The strain gauges are installed on the upper and lower edges of the central section 36 of the sensor beam using Vishay AE-10 two part epoxy adhesive. Well known aerospace manufacturing procedures are used in attaching the strain gauges, including cleaning, clamping and curing.

A four lead cable 68 (FIG. 2) is connected to the terminal strip 66 for transmitting the output signals from each of the strain gauges to a signal processor hereafter described. When the sensor beam 36 is subjected to other stresses such as a torque or longitudinal loading, the Wheatstone bridge arrangement of the strain gauges on the sensor beam cancels the undesirable signals and yields only the desired information.

The strain gauges 58 and 60 (FIG. 2) are on the tension side of the sensor beam. The strain gauges 62 and 64 are on the compression side of the sensor beam. The cable 68 is preferably a shielded cable. Preferably, a moderate coating (not illustrated) of electrical insulation such as DOW DC 738 is spread over the strain gauges, the wiring (not illustrated) between the strain gauges, the terminal strip and the first one and one-half inches of the cable. This coating is specifically excluded from the inboard face of the sensor beam which must be very close to the surface of the load supporting beam. A second layer of water proofing (not illustrated) such as uncured butyal rubber tape approximately one-eighth inch in thickness by one and one-half inches in width is applied over the strain gauges. This tape is preferably stretched around the central section 36c of the sensor beam to form a sleeve of rubber approximately three inches long. This tape is pressed flat on the inboard face of the sensor beam to a thickness of preferably no more than about one-sixteenth of an inch.

The final protective coating for the strain gauges is preferably a three inch long section of polyolefin shrink tubing 70 (FIG. 2). This tubing has a heat activated adhesive lining and can shrink to approximately one-quarter its original diameter of one and one-half inches. The tubing is placed over the butyl rubber tape and reduced in diameter with a heat gun until it conforms to the general contour of the previous coatings. Thus, the strain gauges, terminal strip and wiring are enclosed in several waterproof protective insulative layers. This provides the system with a high degree of reliability and longevity. In addition, because the sensor beam is attached to the central web of the load supporting beam, the lower cap 34b provides a shield that protects the sensors, terminal strip and wiring from rocks and other debris thrown up from the highway.

Referring to FIG. 4, strain gauges 58, 60, 62 and 64 are shown connected together in a Wheatstone bridge configuration to the four wire cable 68. In the illustrated embodiment, the strain gauges 58, 60, 62 and 64 are attached to the front axle beam 12 of the truck 10. Two additional sets 72 and 74 of four strain gauges are connected together in Wheatstone bridge configuration. Each of these strain gauges is mounted on a sensor beam secured to a corresponding one of the equalizer beams 30 and 32 (FIG. 1) of the truck. These sets of strain gauges are attached, secured and mounted to the equalizer beams in the same manner as illustrated and described in connected with FIGS. 2 and 3. The additional sets 72 and 74 of strain gauges are connected in parallel by another four wire cable 76.

Suitable strain gauges are commercially available from Measurements Group of Raleigh, North Carolina. When both the load supporting beam and the sensor beam are made of steel, the model CEA12-125UN-350 strain gauges may be utilized. When the load supporting beam and the sensor beam are made of Aluminum, the model CEA06-12SUN-350 strain gauges may be utilized. Suitable waterproofing compound is available from DOW Chemical under catalog number DC738. Suitable butyl rubber coating tape is available from McMaster-Carr of Los Angeles, Calif. under catalog number 76385A15. A suitable polyolefin jacket is available from RAYCHEM Corporation of Manalow Park, Calif. under catalog number 32/8 ATUM BLK4. Suitable hardened bushings are available from Acme Ind. Company of Carpentersville, Ill., under part number P-28-4. A suitable four-wire insulated shielded cable is available from Carol Wire Company of Warwick, R.I. under catalog number 4/C Referring still to FIG. 4, the cables 68 and 76 are connected to a signal processor 78 through an interface circuit board 80. One suitable commercially available signal processor is a digital weight indicator such as the Model DF2000 manufactured by Western Scale Company, Ltd. of Vancouver, BC., Canada. The system is powered by a battery 82 which is preferably the twelve volt battery from the truck. The interface circuit board includes calibration resistors 84 and 86 which may be connected across two of the wires of cables 68 and 76 by closing switches 88 and 90, respectively. The interface circuit board 80 further includes potiometers 92 and 94 connected to certain wires of the cable 68 and 76 which may be adjusted to "zero out" the system.

Prior to waterproofing, and after the attachment of the associated cable, each sensor beam is preferably bolted to a calibration fixture (not illustrated) made from an actual structural member of the type to be instrumented, such as a steel I-beam. The cable is connected to a suitable strain indicator and the structural member is loaded to appropriate levels of load and stress. The output of the strain gauges versus the load is recorded and a sensitive-to-load factor is determined. This is utilized to determine the value of the calibration resistor. For example, a 350K ohm resistor across one of the four strain gauges may produce a signal equivalent to 15,000 pounds of force on the structural member. The pre-calibration of each sensor beam on a fixture assures compatibility when the sensor is installed on the load supporting beam of a vehicle. The use of hardened bushings at the four bearing points between the load supporting beam and the sensor beam assures repeatability in the measurement of the weight being carried by the vehicle which would otherwise be impaired due to wear caused by flexure of the sensor beam.

In attaching the load sensor beam to the load supporting beam of a vehicle, it is preferable to first drill the required holes in the load sensor beam and then to use the load sensor beam as a drill fixture template. It is further desirable to pre-load the load sensor beam into a linear range by removing any load carried by the vehicle prior to bolting the load sensor beam to the load supporting beam of the vehicle.

Figure 5:
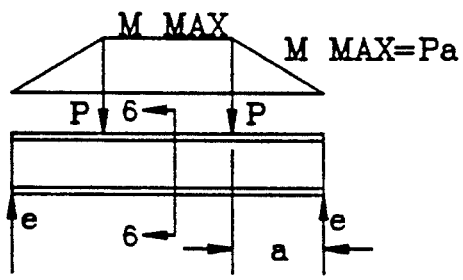
FIGS. 5 is a diagrammatic illustration of the typical bending stresses on the load supporting beam of a vehicle.
Figure 6:
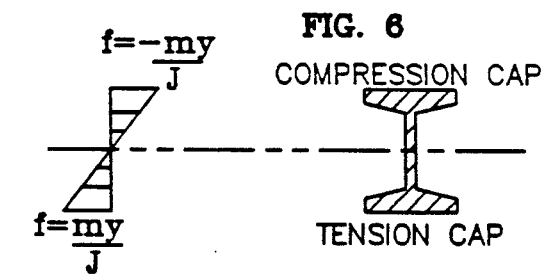
FIG. 6 is a diagrammatic illustration of the intensity of stress on the load supporting beam of FIG. 5. The load supporting beam is shown in a cross-sectional view which is taken along line 6—6 of FIG. 5.

FIG. 5 is a diagrammatic illustration of the typical bending stresses on the load supporting beam of a vehicle. FIG. 6 is a diagrammatic illustration of the intensity of stress on the load supporting beam of FIG. 5. These illustrations indicate that the compression cap and tension cap of the load supporting I-beam are high stress areas. The highest stress is concentrated in the intermediate segment of the load supporting beam in between the end segments thereof.

While I have described a preferred embodiment of my vehicle beam load measuring system, it should be understood that modifications and adaptations thereof will occur to persons skilled in the art. Therefore, the protection afforded my invention should only be limited in accordance with the scope of the following claims.

I claim:

1. A system for sensing the load carried by a vehicle, comprising:

an elongate load supporting beam having a horizontal upper compression cap, a horizontal lower tension cap, a vertical central web connection the caps, a first neutral axis extending along the web in a longitudinal direction midway between the caps, and a center line extending across the web in a transverse direction equi-distant from a pair of opposite ends of the load supporting beam, the web having a first pair of holes extending therethrough which are centered on the first neutral axis on a first side of the center line and a second pair of holes extending therethrough which are centered on the first neutral axis on a second side of the center line;

an elongate, generally rectangular sensor beam overlying a longitudinally intermediate section of the web of the load supporting beam so that a second neutral axis extends along the sensor beam in the longitudinal direction midway between the caps and is in parallel alignment with the first enthrall axis of the load supporting beam, the sensor beam having a central section with a cross-sectional area less than a cross-sectional area of a pair of first and second opposite end sections, a first pair of holes in the first end section each registered with a corresponding one of the first pair of holes in the web, and a second pair of holes in the second end section each register with a corresponding one of the second pair of holes in the web;

means for releasably securing the first and second opposite end sections of the sensor beam to the web of the load supporting beam, including four bolts each extending through registered holes in the load supporting beam and the sensor beam;

four strain gauges electrically connected in a Wheatstone bridge configuration, a first pair of the strain gauges being secured to an upper edge of the central section of the sensor beam and a second pair of the strain gauges being secured to a lower edge of the central section of the sensor beam; and cable means for transmitting an output signal from each of the strain gauges to a signal processor.

2. A system according to claim 1 wherein the means for releasably securing the end sections of the sensor beam to the web of the load supporting beam further includes four hardened bushings, each bushing surrounding a corresponding one of the bolts and tightly fit within a corresponding hole in the web of the sensor beam.

3. A system according to claim 1 and further comprising a section of polyolefin tubing shrunk over the strain gauges and the central section of the sensor beam.

4. A system according to claim 1 wherein the means for releasably securing the end sections of the sensor beam to the web of the load supporting beam further includes a plurality of washers surrounding the bolts and overlying the web and the sensor beam.

5. A system according to claim 1 wherein the cable means includes a terminal strip secured to an outboard face of the central section of the sensor beam.

* * * * *

UNITED STATES PATENT AND TRADEMARK OFFICE
CERTIFICATE OF CORRECTION

PATENT NO. : 5,327,791
DATED : July 12, 1994
INVENTOR(S) : Robert R. Walker

It is certified that error appears in the above-indentified patent and that said Letters Patent is hereby corrected as shown below:

In Claim 1, column 7, line 2, delete "enthrall" and insert therefor --neutral--.

In Claim 1, column 7, line 11, delete "register" and insert therefor --registered--.

Signed and Sealed this

Twenty-seventh Day of September, 1994

Attest:

BRUCE LEHMAN

*Attesting Officer*   *Commissioner of Patents and Trademarks*